March 24, 1931.   E. L. BEECHER   1,797,395
VEHICLE BRAKE DEVICE
Filed Oct. 8, 1927
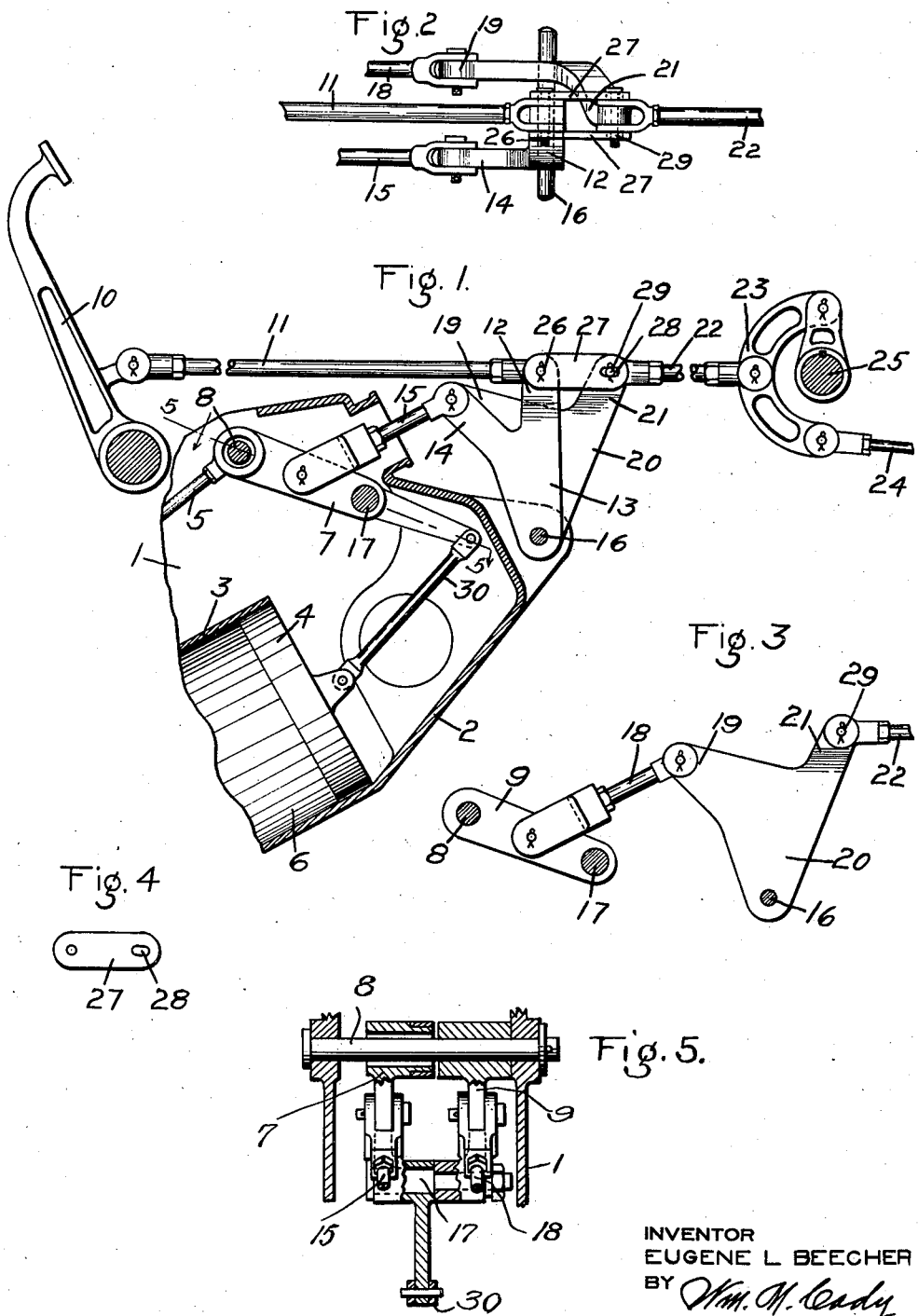
INVENTOR
EUGENE L BEECHER
BY
ATTORNEY Patented Mar. 24, 1931

1,797,395

UNITED STATES PATENT OFFICE

EUGENE L. BEECHER, OF NEW HAVEN, CONNECTICUT, ASSIGNOR TO THE WESTING-HOUSE AIR BRAKE COMPANY, OF WILMERDING, PENNSYLVANIA, A CORPORATION OF PENNSYLVANIA

VEHICLE BRAKE DEVICE

Application filed October 8, 1927. Serial No. 224,964.

This invention relates to automotive brakes, and more particularly to a brake of the servo type.

One object of my invention is to provide a brake in which the servo power and brake control unit is so connected that a minimum overall length is required between the operating pedal and the brake applying rods.

Another object of my invention is to provide a direct connecting means between the operating pedal and the brake rigging for applying the brakes mechanically in case the power brake fails.

Other objects and advantages will appear in the following more detailed description of the invention.

In the accompanying drawing, Fig. 1 is a side elevational view of an automotive brake equipment embodying my invention; Fig. 2 a plan view of a portion of the construction shown in Fig. 1; Fig. 3 a detail view of one of the bell crank members and its connections as employed in Fig. 1; Fig. 4 a detail view of one of the links employed in operating the brakes mechanically; and Fig. 5 a section on the line 5—5 of Fig. 1.

As shown in the drawing, the brake apparatus may comprise a servo power and brake controlling unit 1 of the vacuum type having a casing 2 containing a cylinder 3 in which is mounted a piston 4. An operating rod 5 is connected to a valve mechanism (not shown) by the operation of which a vacuum is created in the chamber 6 of the cylinder 3 to apply the brakes, and air from the atmosphere is admitted thereto for releasing the brakes.

The rod 5 is pivotally connected to one end of a lever 7, the outer end of said lever being operatively connected to piston 4. A shaft 8, fixed to the casing 2, extends through an enlarged opening in the end of lever 7 and pivotally connected to said shaft is a lever 9.

An operating pedal lever 10 is pivotally connected to one end of a rod 11, the other end of the rod 11 being pivotally connected to an arm 12 of a bell crank lever 13. The other arm 14 of said lever is pivotally connected to a rod 15, the outer end of which is pivotally connected to the lever 7. The bell crank 13 is pivotally mounted on a pin 16, secured to the casing 2.

The levers 7 and 9 are mounted on a floating pivot pin 17 and pivotally connected to lever 9 is a rod 18, the outer end of which is pivotally connected to one arm 19 of a bell crank 20. The other arm 21 is pivotally connected to a rod 22. The bell crank 20 is also pivotally mounted on pin 16. The rod 22 is connected to an equalizer 23 which is connected to a rod 24 for operating the rear wheel brakes and to a shaft 25 for operating the front wheel brakes.

Mounted at one end on pivot pin 26 connecting the rod 11 with arm 12 are links 27 and the opposite ends of the links are provided with elongated slots 28 through which extends the pivot pin 29 which connects the arm 21 with the rod 22.

When the brakes are to be applied, the pedal lever 10 is moved in a counter-clockwise direction, causing movement of rod 11 toward the left and a counter-clockwise movement of the bell crank 13. The rod 15 is thereby moved toward the left and the lever 7 is moved so as to shift the valve operating rod 5, the clearance space between the fixed shaft 8 and the lever 7 permitting a limited movement.

The valve mechanism (not shown) is then operated so as to reduce the atmospheric pressure in chamber 6, so that piston 4 is moved toward the left by atmospheric pressure acting on the outer face of the piston.

Movement of piston 4 toward the left causes the rod to move the lever 7, which is connected at its lower end to the link 30 and which is pivotally mounted on the pin 17, so that the floating pin 17 is moved with the lever 7 toward the left, and with the pin 17 the lower end of the lever 9 is also moved toward the left, with the pin 8 acting as a fulcrum for the lever 9, causing a movement of rod 18, which is connected to the lever 9, toward the left and thus causing a counter-clockwise movement of the bell crank 20. The rod 22 is then moved toward the left to cause the equalizer 23 to be operated and thereby the brakes to be applied.

The slots 28 in the links normally prevent transmission of pressure direct from the pedal lever to the brakes, so long as the power brake is effective, but if the power brake should fail, then movement of the pedal lever 10 to apply the brakes will cause the lost motion in the slots 28 to be taken up, so that the rod 22 is operated by engagement of the pivot pin 29 at the ends of the slots, and the brakes are then applied by direct mechanical force as the pedal lever is depressed.

By employing the bell crank connections between the pedal lever, the servo unit and the brake applying members, the servo unit may be disposed as desired, so that the interposition of the servo unit does not increase the over-all length between the pedal lever and the braking members.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a motor vehicle brake, the combination with a pedal lever, a rod connected to said lever, and a brake applying rod, of a power unit disposed out of alinement with said rods and including a valve operating member and a power transmitting member, a member connecting the valve operating member to said lever rod, and a separately movable member connecting said power unit to said brake applying rod.

2. In a motor vehicle brake, the combination with a pedal lever, a rod connected to said lever, and a brake applying rod, of a servo power unit disposed out of alinement with said rods and having a valve operating member and a power transmitting member, a bell crank operatively connecting said lever rod with said valve operating member, and a bell crank operatively connecting said brake applying rod with said power transmitting member.

3. In a motor vehicle brake, the combination with a pedal lever, a rod connected to said lever, a brake applying rod disposed in alinement with said first mentioned rod, of a servo power unit, a bell crank connecting the lever rod to said unit, a separately movable bell crank connecting the brake applying rod with said unit, and a link connecting the lever rod with the brake applying rod.

4. In a motor vehicle brake, the combination with a pedal lever, a rod connected to said lever, a brake applying rod disposed in alinement with said first mentioned rod, of a servo power unit, a pivoted member having one arm connected to the lever rod and another arm connected to said unit, a second pivoted member having one arm connected to the brake applying rod and another arm to said unit, and a link connecting the lever rod with the brake applying rod.

In testimony whereof I have hereunto set my hand.

EUGENE L. BEECHER.